United States Patent
Mandava et al.

(10) Patent No.: US 9,792,571 B1
(45) Date of Patent: Oct. 17, 2017

(54) EFFICIENCY TRACKING SYSTEM FOR A DRILLING RIG

(71) Applicant: Nabors Drilling Technologies USA, Inc., Houston, TX (US)

(72) Inventors: Chakrapani Mandava, Houston, TX (US); Michael David Lockridge, Houston, TX (US)

(73) Assignee: Nabors Drilling Technologies USA, Inc., Houston, TX (US)

(*) Notice: Subject to any disclaimer, the term of this patent is extended or adjusted under 35 U.S.C. 154(b) by 0 days.

(21) Appl. No.: 15/098,620

(22) Filed: Apr. 14, 2016

(51) Int. Cl.
| | | |
|---|---|---|
| *G01V 1/40* | (2006.01) | |
| *G01V 3/18* | (2006.01) | |
| *G01V 5/04* | (2006.01) | |
| *G01V 9/00* | (2006.01) | |
| *G06Q 10/06* | (2012.01) | |
| *E21B 41/00* | (2006.01) | |

(52) U.S. Cl.
CPC ... *G06Q 10/06393* (2013.01); *E21B 41/0092* (2013.01)

(58) Field of Classification Search
USPC ......................................... 702/6, 9; 705/7.11
See application file for complete search history.

(56) References Cited

U.S. PATENT DOCUMENTS

| | | | | |
|---|---|---|---|---|
| 6,892,812 B2 * | 5/2005 | Niedermayr | ............ | E21B 44/00 166/250.15 |
| 7,031,840 B1 * | 4/2006 | Brett | ....................... | E21B 44/00 702/9 |
| 7,128,167 B2 * | 10/2006 | Dunlop | .................. | G06N 7/005 175/24 |
| 7,243,735 B2 * | 7/2007 | Koederitz | ............. | E21B 49/003 175/40 |
| 8,050,889 B2 * | 11/2011 | Fluegge | ................. | G06Q 10/06 702/182 |
| 8,812,236 B1 * | 8/2014 | Freeman | ............... | E21B 21/065 175/66 |
| 2014/0070956 A1 * | 3/2014 | Winkler | ................ | G08C 19/00 340/870.01 |
| 2014/0326449 A1 * | 11/2014 | Samuel | .................. | E21B 44/00 166/250.01 |

FOREIGN PATENT DOCUMENTS

WO    WO2015/088529    6/2015

OTHER PUBLICATIONS

"Energizing Drill Operations" pp. 21-22. Oilfield Technology, Mar. 2016 http://publications.energyglobal.com/flip/oilfield-technology/2016/March/files/assets/basic-html/page21.html.

(Continued)

*Primary Examiner* — Amber A Misiaszek
(74) *Attorney, Agent, or Firm* — Haynes and Boone, LLP

(57) ABSTRACT

Systems, devices, and methods for tracking the efficiency of a drilling rig are provided. A sensor system on a drilling rig is provided. A controller in communication with the sensor system may be operable to generate measurable parameters relating to at least one Key Performance Indicators (KPIs). The measurable parameters may be compared with measurable parameters from a target to generate an Invisible Lost Time (ILT) period and an Invisible Saved Time (IST) period for the drilling rig. The KPIs, ILT period, and IST period may be displayed to a user.

23 Claims, 8 Drawing Sheets

(56) References Cited

OTHER PUBLICATIONS

Kelli Fereday, "Downhole Drilling Problems: Drilling Mysteries Revealed!" AAPL 58$^{th}$ Annual Meeting Jun. 13-16, 2012.

Sameh El Afifi, et al. "Enhance the Drilling and Tripping Performance on Automated Rigs with Fully Automate Performance Measurement," SPE-176786-MS, Society of Petroleum Engineers, 2015.

Andersen, Ketil, et al. "Case History: Automated Performance Measurement of Crews and Drilling Equipment." SPE-119746-MS, SPE/IADC Drilling Conference and Exhibition, Society of Petroleum Engineers, 2009. https://www.onepetro.org/conference-paper/SPE-119746-MS.

Sameh El Afifi, et al. "Enhance the Drilling and Tripping Performance on Automated Rigs with Fully Automated Performance Measurement." SPE-176786-MS, Society of Petroleum Engineers, 2015.

* cited by examiner

EFFICIENCY TRACKING SYSTEM FOR A DRILLING RIG

TECHNICAL FIELD

The present disclosure is directed to systems, devices, and methods for tracking the efficiency of a drilling rig.

BACKGROUND OF THE DISCLOSURE

Drilling operations are generally highly time-sensitive. Generally, the objective of a drilling operation is to drill as quickly as possible under the safety, technological, operational, and quality restraints associated with the drilling operation. To maximize the speed at which the drilling operation occurs, drillers typically establish a drilling plan that includes time estimates to accomplish various tasks at the outset of the drilling operation. These estimates may include Bit on Bottom Time (BOBT) and Flat Time (FT) estimates. BOBT may be defined as the total time the drill bit will take to drill a wellhole according to a drill plan. FT may be defined as the time necessary to construct a well not including the BOBT. More specifically, FT may include time required to handle tubulars and other components, running casing, blow out preventer (BOP) installation and maintenance, bottom hole assembly (BHA) handling, tripping, and other procedures.

Besides calculated time constraints, drilling operations are often delayed by unexpected time losses. These may include Downtime (DT) and Invisible Lost Time (ILT). DT includes unexpected problems that arise during a drilling operation, including accidents, tool failures, supply problems, unexpected environmental conditions, hole problems, and others. BOBT, FT, and DT are generally tracked with the time estimates, and may appear on drilling reports (such as rig morning reports, operations reports, tour reports, mud reports, or cuttings analyses) or on downhole and surface measurements. In contrast, ILT is generally not tracked during a drilling operation. Drilling operators generally seek to minimize time losses associated with expected or unexpected events. Accordingly, better and more efficient time management technologies are needed.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
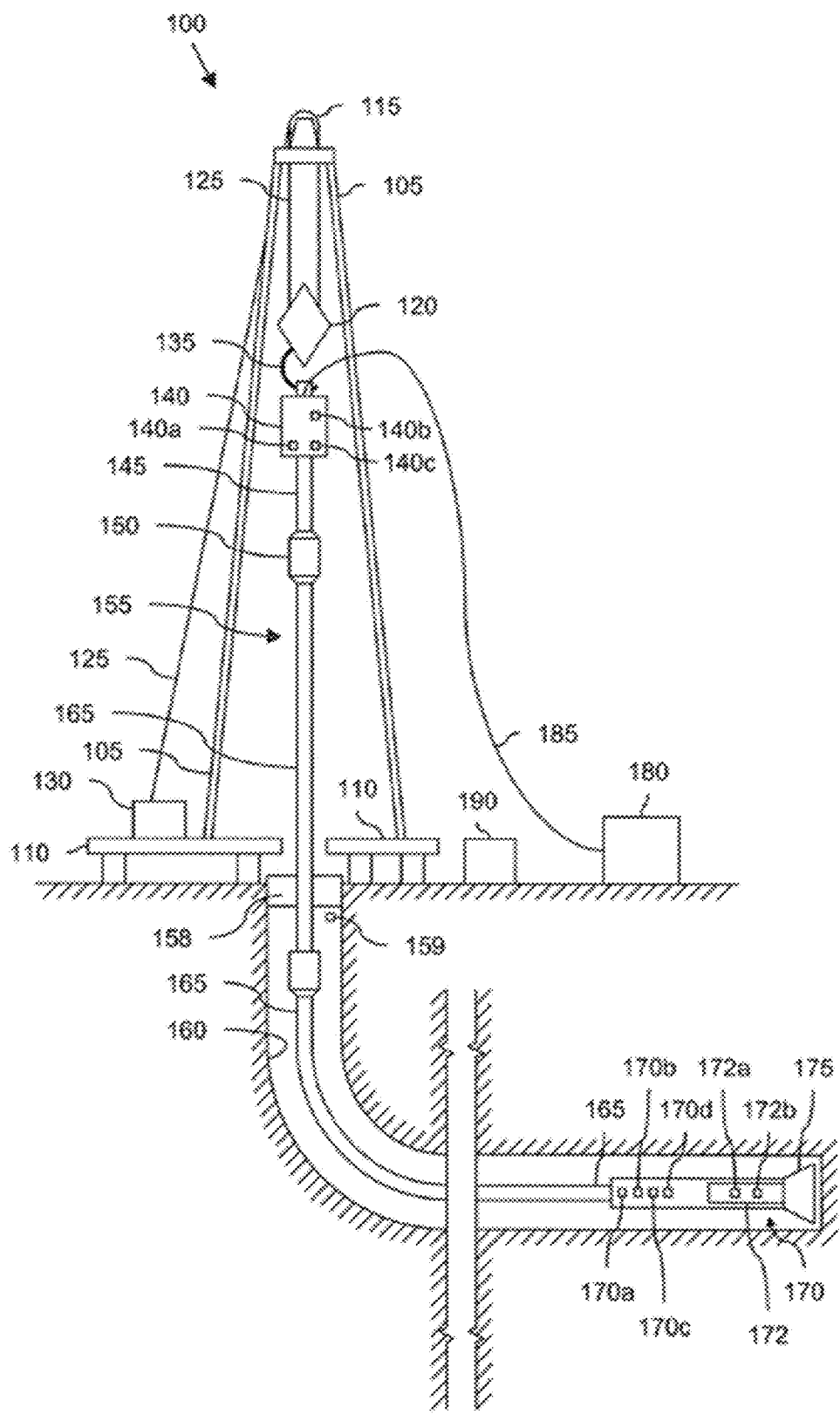
FIG. 1 is a schematic of an exemplary drilling apparatus according to one or more aspects of the present disclosure.

It is to be understood that the following disclosure provides many different implementations, or examples, for implementing different features of various implementations. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various implementations and/or configurations discussed.

The systems and methods disclosed herein enable users to identify and track efficiency and inefficiencies of a drilling process. In particular, the present disclosure provides for the tracking of time losses from various sources and the creation of a time loss report showing system efficiency. The time losses may be calculated using sensor readings and other input data.

In particular, drilling operations usually begin with the identification of a target location, and an optimal wellbore profile or drill plan is typically established before drilling commences. Such proposed drill plans are generally based on optimizing drilling time to reach hydrocarbons and achieve a producing well. The proposed drill plan generally takes into account time constraints associated with various tasks that are required to meet the goals of the drill plan. As drilling proceeds, expected and unexpected time losses may occur for a variety of reasons. The devices, systems, and methods disclosed herein may allow for the tracking of previously unrecorded ILT and IST periods and systems for reporting these time losses and time savings.

ILT may represent the difference between the actual time taken to complete a drilling operation and a target time to complete the drilling operation. The target time may be based upon configurable performance targets, previous drilling operations, and/or drilling operations of other wells that are similar to the present well. The target time may represent an efficiency target. Although ILT makes up a substantial portion of the delays on drilling rigs, delays associated with ILT are not tracked on any reports in conventional drilling rigs.

Operators may be interested in tracking which parts of an operation exceed expectations. In that regard, Invisible Saved Time (IST) may include time saved during an operation as compared to a target. The systems, devices, and methods described herein may allow for the identification, tracking, and application of ILT and IST periods to improve the efficiency of drilling operations.

Referring to FIG. 1, illustrated is a schematic view of apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to drawworks 130, which is configured to reel in and out the drilling line 125 to cause the traveling block 120 to be lowered and raised relative to the rig floor 110. The other end of the drilling line 125, known as a dead line anchor, is anchored to a fixed position, possibly near the drawworks 130 or elsewhere on the rig.

A hook 135 may be attached to the bottom of the traveling block 120. A top drive 140 may be suspended from the hook 135. A quill 145 extending from the top drive 140 may be attached to a saver sub 150, which may be attached to a drill string 155 suspended within a wellbore 160. Alternatively, the quill 145 may be attached to the drill string 155 directly. The term "quill" as used herein is not limited to a component which directly extends from the top drive, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, albeit merely for the sake of clarity and conciseness, these components may be collectively referred to herein as the "quill."

The drill string 155 may include interconnected sections of drill pipe 165, a bottom hole assembly (BHA) 170, and a drill bit 175. The BHA 170 may include stabilizers, drill collars, and/or measurement-while-drilling (MWD) instruments, among other components. For the purpose of slide drilling the drill string may include a downhole motor with a bent housing or other bend component, operable to create an off-center departure of the bit from the center line of the wellbore. The direction of this departure in a plane normal to the wellbore is referred to as the toolface angle or toolface. The drill bit 175, which may also be referred to herein as a "tool," or a "toolface," may be connected to the bottom of the BHA 170 or otherwise attached to the drill string 155. One or more pumps 180 may deliver drilling fluid to the drill string 155 through a hose or other conduit, which may be connected to the top drive 140.

The downhole MWD instruments may be configured for the evaluation of physical properties such as pressure, temperature, torque, weight-on-bit (WOB), vibration, inclination, azimuth, toolface orientation in three-dimensional space, and/or other downhole parameters. These measurements may be made downhole, stored in memory, such as solid-state memory, for some period of time, and downloaded from the instrument(s) when at the surface and/or transmitted in real-time to the surface. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, transmission as electromagnetic pulses, among other methods. The MWD sensors or detectors and/or other portions of the BHA 170 may have the ability to store measurements for later retrieval via wireline and/or when the BHA 170 is tripped out of the wellbore 160. In some implementations, the MWD sensors may be used to evaluate efficiency and identify time losses associated with the drilling operation.

In an exemplary implementation, the apparatus 100 may also include a blow out preventer (BOP) 158 (which may include a rotating head or diverter) that may assist when the well 160 is being drilled utilizing under-balanced or managed-pressure drilling methods. The apparatus 100 may also include a surface casing annular pressure sensor 159 configured to detect the pressure in an annulus defined between, for example, the wellbore 160 (or casing therein) and the drill string 155.

In the exemplary implementation depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 also includes a controller 190 configured to control or assist in the control of one or more components of the apparatus 100. For example, the controller 190 may be configured to transmit operational control signals to the drawworks 130, the top drive 140, the BHA 170 and/or the pump 180. The controller 190 may be a stand-alone component installed near the mast 105 and/or other components of the apparatus 100. In an exemplary implementation, the controller 190 includes one or more systems located in a control room in communication with the apparatus 100, such as the general purpose shelter often referred to as the "doghouse" serving as a combination tool shed, office, communications center, and general meeting place. The controller 190 may be configured to transmit the operational control signals to the drawworks 130, the top drive 140, the BHA 170, and/or the pump 180 via wired or wireless transmission means which, for the sake of clarity, are not depicted in FIG. 1.

The controller 190 is also configured to receive electronic signals via wired or wireless transmission means (also not shown in FIG. 1) from a variety of sensors included in the apparatus 100, where each sensor is configured to detect an operational characteristic or parameter. Depending on the implementation, the apparatus 100 may include a downhole annular pressure sensor 170a coupled to or otherwise associated with the BHA 170. The downhole annular pressure sensor 170a may be configured to detect a pressure value or range in an annulus shaped region defined between the external surface of the BHA 170 and the internal diameter of the wellbore 160, which may also be referred to as the casing pressure, downhole casing pressure, MWD casing pressure, or downhole annular pressure. Measurements from the downhole annular pressure sensor 170a may include both static annular pressure (pumps off) and active annular pressure (pumps on).

It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data.

The apparatus 100 may additionally or alternatively include a shock/vibration sensor 170b that is configured to detect shock and/or vibration in the BHA 170. The apparatus 100 may additionally or alternatively include a mud motor delta pressure (ΔP) sensor 172a that is configured to detect a pressure differential value or range across one or more motors 172 of the BHA 170. The one or more motors 172 may each be or include a positive displacement drilling motor that uses hydraulic power of the drilling fluid to drive the drill bit 175, also known as a mud motor. One or more torque sensors 172b may also be included in the BHA 170 for sending data to the controller 190 that is indicative of the torque applied to the drill bit 175 by the one or more motors 172.

The apparatus 100 may additionally or alternatively include a toolface sensor 170c configured to detect the current toolface orientation. The toolface sensor 170c may be or include a conventional or future-developed magnetic toolface sensor which detects toolface orientation relative to magnetic north. Alternatively, or additionally, the toolface sensor 170c may be or include a conventional or future-developed gravity toolface sensor which detects toolface orientation relative to the Earth's gravitational field. The toolface sensor 170c may also, or alternatively, be or include a conventional or future-developed gyro sensor. The apparatus 100 may additionally or alternatively include a WOB sensor 170d integral to the BHA 170 and configured to detect WOB at or near the BHA 170.

The apparatus 100 may additionally or alternatively include a torque sensor 140a coupled to or otherwise associated with the top drive 140. The torque sensor 140a may alternatively be located in or associated with the BHA 170. The torque sensor 140a may be configured to detect a value or range of the torsion of the quill 145 and/or the drill string 155 (e.g., in response to operational forces acting on the drill string). The top drive 140 may additionally or alternatively include or otherwise be associated with a speed sensor 140b configured to detect a value or range of the rotational speed of the quill 145.

The top drive 140, drawworks 130, crown or traveling block, drilling line or dead line anchor may additionally or alternatively include or otherwise be associated with a WOB sensor 140c (WOB calculated from a hook load sensor that may be based on active and static hook load) (e.g., one or more sensors installed somewhere in the load path mechanisms to detect and calculate WOB, which may vary from rig-to-rig) different from the WOB sensor 170d. The WOB sensor 140c may be configured to detect a WOB value or range, where such detection may be performed at the top drive 140, drawworks 130, or other component of the apparatus 100.

The detection performed by the sensors described herein may be performed once, continuously, periodically, and/or at random intervals. The detection may be manually triggered by an operator or other person accessing a human-machine interface (HMI), or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the system.

Figure 2:
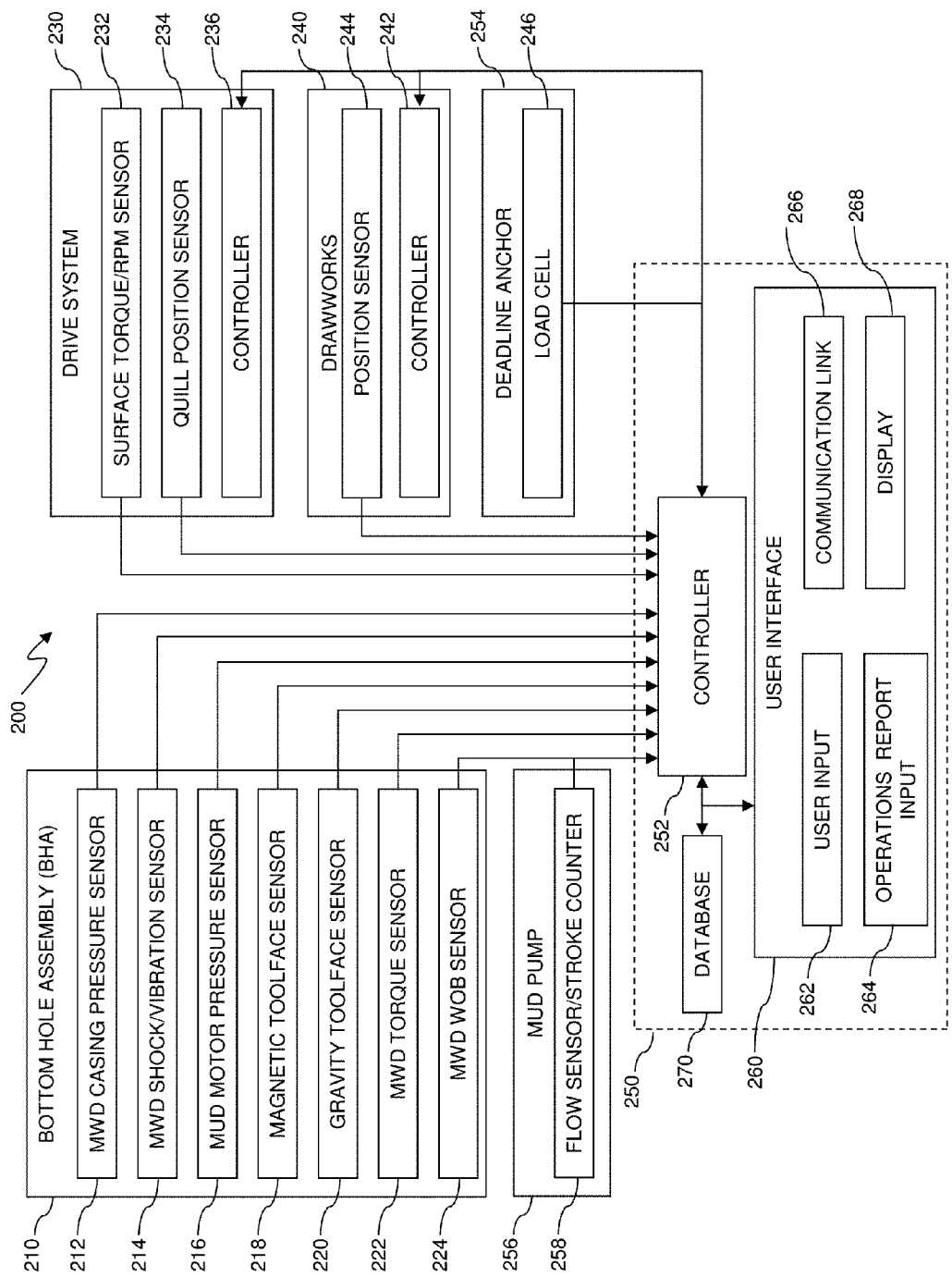
FIG. 2 is a schematic of an exemplary drilling apparatus system according to one or more aspects of the present disclosure.

Referring to FIG. 2, illustrated is a block diagram of an apparatus 200 according to one or more aspects of the present disclosure. The apparatus 200 may include a user interface 260, a BHA 210, a drive system 230, a drawworks 240, a deadline anchor 254, a mud pump 256, a controller 252, and a database 270. The apparatus 200 may be implemented within the environment and/or apparatus 100 shown in FIG. 1. For example, the BHA 210 may be substantially similar to the BHA 170 shown in FIG. 1, the drive system 230 may be substantially similar to the top drive 140 shown in FIG. 1, the drawworks 240 may be substantially similar to the drawworks 130 shown in FIG. 1, and the controller 252 may be substantially similar to the controller 190 shown in FIG. 1.

The BHA 210, the drive system 230, the drawworks 240, the deadline anchor 254, and the mud pump 256 may contain sensors that measure various characteristics or qualities of the drilling rig. These sensors may transmit readings to the various controllers 236, 242, 252 to be analyzed. In some implementations, the sensor readings may be used to track the efficiency of a drilling operation on the drilling rig. In particular, the sensor readings may be analyzed to measure invisible lost time (ILT) periods or invisible saved time (IST) periods.

The BHA 210 may include an MWD casing pressure sensor 212 that is configured to detect an annular pressure value or range at or near the MWD portion of the BHA 210, and that may be substantially similar to the downhole annular pressure sensor 170a shown in FIG. 1. The casing pressure data detected via the MWD casing pressure sensor 212 may be sent via electronic signal to the controller 252 via wired or wireless transmission.

The BHA 210 may also include an MWD shock/vibration sensor 214 that is configured to detect shock and/or vibration in the MWD portion of the BHA 210, and that may be substantially similar to the shock/vibration sensor 170b shown in FIG. 1. The shock/vibration data detected via the MWD shock/vibration sensor 214 may be sent via electronic signal to the controller 252 via wired or wireless transmission.

The BHA 210 may also include a mud motor pressure (ΔP) sensor 216 that is configured to detect a pressure differential value or range across the mud motor of the BHA 210, and that may be substantially similar to the mud motor ΔP sensor 172a shown in FIG. 1. The pressure differential data detected via the mud motor ΔP sensor 216 may be sent via electronic signal to the controller 252 via wired or wireless transmission. The mud motor ΔP may be alternatively or additionally calculated, detected, or otherwise determined at the surface, such as by calculating the difference between the surface standpipe pressure just off-bottom and pressure once the bit touches bottom and starts drilling and experiencing torque.

The BHA 210 may also include a magnetic toolface sensor 218 and a gravity toolface sensor 220 that are cooperatively configured to detect the current toolface, and that collectively may be substantially similar to the toolface sensor 170c shown in FIG. 1. The magnetic toolface sensor 218 may be or include a conventional or future-developed magnetic toolface sensor which detects toolface orientation relative to magnetic north. The gravity toolface sensor 220 may be or include a conventional or future-developed gravity toolface sensor which detects toolface orientation relative to the Earth's gravitational field. In an exemplary implementation, the magnetic toolface sensor 218 may detect the current toolface when the end of the wellbore is less than about 7° from vertical, and the gravity toolface sensor 220 may detect the current toolface when the end of the wellbore is greater than about 7° from vertical. However, other toolface sensors may also be utilized within the scope of the present disclosure, including non-magnetic toolface sensors and non-gravitational inclination sensors. In any case, the toolface orientation detected via the one or more toolface sensors (e.g., magnetic toolface sensor 218 and/or gravity toolface sensor 220) may be sent via electronic signal to the controller 252 via wired or wireless transmission.

The BHA 210 may also include an MWD torque sensor 222 that is configured to detect a value or range of values for torque applied to the bit by the motor(s) of the BHA 210, and that may be substantially similar to the torque sensor 172b shown in FIG. 1. The torque data detected via the MWD torque sensor 222 may be sent via electronic signal to the controller 252 via wired or wireless transmission. The BHA 210 may also include a MWD WOB sensor 224 that is configured to detect a value or range of values for WOB at or near the BHA 210, and that may be substantially similar to the WOB sensor 170d shown in FIG. 1. The WOB data detected via the MWD WOB sensor 224 may be sent via electronic signal to the controller 252 via wired or wireless transmission.

The drive system 230 may include a surface torque/rpm sensor 232, a quill position sensor 234, and a controller 236. The surface torque/rpm sensor 232 may be configured to detect a value or range of the reactive torsion of the quill or drill string, much the same as the torque sensor 140a shown in FIG. 1. The surface torque/rpm sensor 232 may also be configured to measure the rotation speed of the quill or drill string. In some implementations, the surface torque/rpm sensor 232 includes a single sensor that is operable to measure torque and rotation speed, while in other implementations, the surface torque/rpm sensor 232 includes two or more sensors that individually measure the torque and rotation speed. The drive system 230 may also include a quill position sensor 234 that is configured to detect a value or range of the rotational position of the quill, such as relative to true north or another stationary reference. The surface torsion, rotation speed, and quill position data detected via the surface torque/rpm sensor 232 and the quill position sensor 234, respectively, may be sent via electronic signal to the controller 252 via wired or wireless transmission. The drive system 230 also includes a controller 236 and/or other means for controlling the rotational position, speed and direction of the quill or other drill string component coupled to the drive system 230 (such as the quill 145 shown in FIG. 1).

The drawworks 240 may include a position sensor 244 and a controller 242 and/or other means for controlling feed-out and/or feed-in of a drilling line (such as the drilling line 125 shown in FIG. 1). Such control may include rotational control of the drawworks 240 (in v. out) to control the height or position of the hook, and may also include control of the rate the hook ascends or descends. The position sensor 244 may be operable to measure the height of a drill string or the depth of a wellhole. The position sensor 244 may be suitable for use on drilling rigs using a traveling block 120 or a movable platform.

The deadline anchor 254 may include a load cell 246. The load cell 246 may also be disposed on a hook, such as the hook 135 of FIG. 1. The load cell 246 may be operable to measure the weight on a lifting system. The load cell 246 may also be configured for use on a drilling rig with a movable platform. For example, some drilling rigs may use a platform mounted on a rack and pinion system as a primary lifting system. The load cell 246 may be used to measure the weight of a drill string and other components on any of these types of drilling rigs.

The mud pump 256 may include a flow sensor/stroke counter 258 which may be configured to measure the flow rate of fluid issuing from the mud pump 256 as well as being configured to count the strokes of the mud pump 256. In some implementations, the flow sensor/stroke counter 258 is a single sensor device, while in other implementations, the flow sensor/stroke counter 258 includes several devices.

The controller 252 may be configured to receive one or more of the above-described parameters from the user interface 260, the BHA 210, the drive system 230, and/or the drawworks 240, and utilize such parameters to continuously, periodically, or otherwise determine efficiency metrics for the drilling rig. The controller 252 may be further configured to generate a control signal, such as via intelligent adaptive control, and provide the control signal to the drive system 230 and/or the drawworks 240 to adjust and/or maintain a toolface orientation. For example, the controller 252 may provide one or more signals to the drive system 230 and/or the drawworks 240 to increase or decrease WOB and/or quill position, such as may be required to accurately "steer" the drilling operation.

The user interface 260, controller 252, and database 270 may be discrete components that are interconnected via wired or wireless means. Alternatively, the user interface 260, controller 252, and database 270 may be integral components of a single system or controller 250, as indicated by the dashed lines in FIG. 2.

The database 270 may be configured to store data for the present well and drilling operation, as well as information about wells and associated drilling rigs that share characteristics with the present well and drilling rig. For example, the database 270 may be populated with data from wells nearby, wells having similar geology, wells drilled to obtain similar types of hydrocarbons, or wells operated by the same client. The database 270 may be any type of reliable storage solution such as a RAID-based storage server, an array of hard disks, a storage area network of interconnected storage devices, an array of tape drives, or some other scalable storage solution located either within a drilling rig or remotely located (i.e., in the cloud).

The user interface 260 may include a user input 262, an operations report input 264, a communication link 266, and a display 268. The user interface 260 may be used to track the efficiency of a drilling rig, produce reports, and communicate efficiency results with others. In some implementations, the user input 262 is used to input or more efficiency metrics or estimates. For example, a user may input Key Performance Indicators (KPIs) that refer to various metrics measured during a drilling procedure. A user may also enter observed information about the well through the user input 262 such as recorded times for various procedures, the operator present, and estimated delays, as well as other types of information. The user input 262 may include a keypad, voice-recognition apparatus, dial, button, switch, slide selector, toggle, joystick, mouse, data base and/or other conventional or future-developed data input device. Such user input 262 may support data input from local and/or remote locations. Alternatively, or additionally, the user input 262 may include means for user-selection of predetermined toolface set point values or ranges, such as via one or more drop-down menus. The toolface set point data may also or alternatively be selected by the controller 252 via the execution of one or more database look-up procedures. In general, the user input 262 and/or other components within the scope of the present disclosure support operation and/or monitoring from stations on the rig site as well as one or more remote locations with a communications link to the system, network, local area network (LAN), wide area network (WAN), Internet, satellite-link, and/or radio, among other means.

The operations report input 264 may be used to input operations reports, tour reports, and/or tour sheets. In particular, operations reports include any report filled out by a member of the rig crew detailing what activities the rig did during a specified period of time. These may include IADC tour sheet reports, CAODC tour sheet reports, daily morning reports, or other company specific reports. In some implementations, operations reports track operating times and Downtime (DT) for a drilling rig and are updated regularly. In some implementations, operations reports include DT information that is divided into separate categories, such as DT for maintaining the top drive, DT for repairing the drawworks, and DT for replacing a mud pump, for example. Operations reports may be input through the operations report input 264 at regular intervals, such as every hour, every day, every week, every month, or at other intervals. Operations reports may be automatically entered into the operations report input 264. In some implementations, operations reports or tour reports from several wells are input into the operations report input 264.

The communication link 266 may be used to communicate information between various components. In some implementations, the communications link 266 may be operable to communicate across networks, local area networks (LAN), wide area networks (WAN), the Internet, satellite-links, and/or by radio communications, among other means.

The display 268 may configured to display information to a user. The display 268 may be any type of output device. In some implementations, the display 268 is an electronic display device, a text-based report, an electronic report, an email report, or a printed report. In some implementations, the display 268 may be an interface such as a computer screen. The display 268 may be used to display analysis results, including operations reports, efficiency diagrams, sensor readings, and measurements of ILT and IST, for example. The display 268 may be used to display information such as that shown in FIGS. 5-8.

Figure 3:
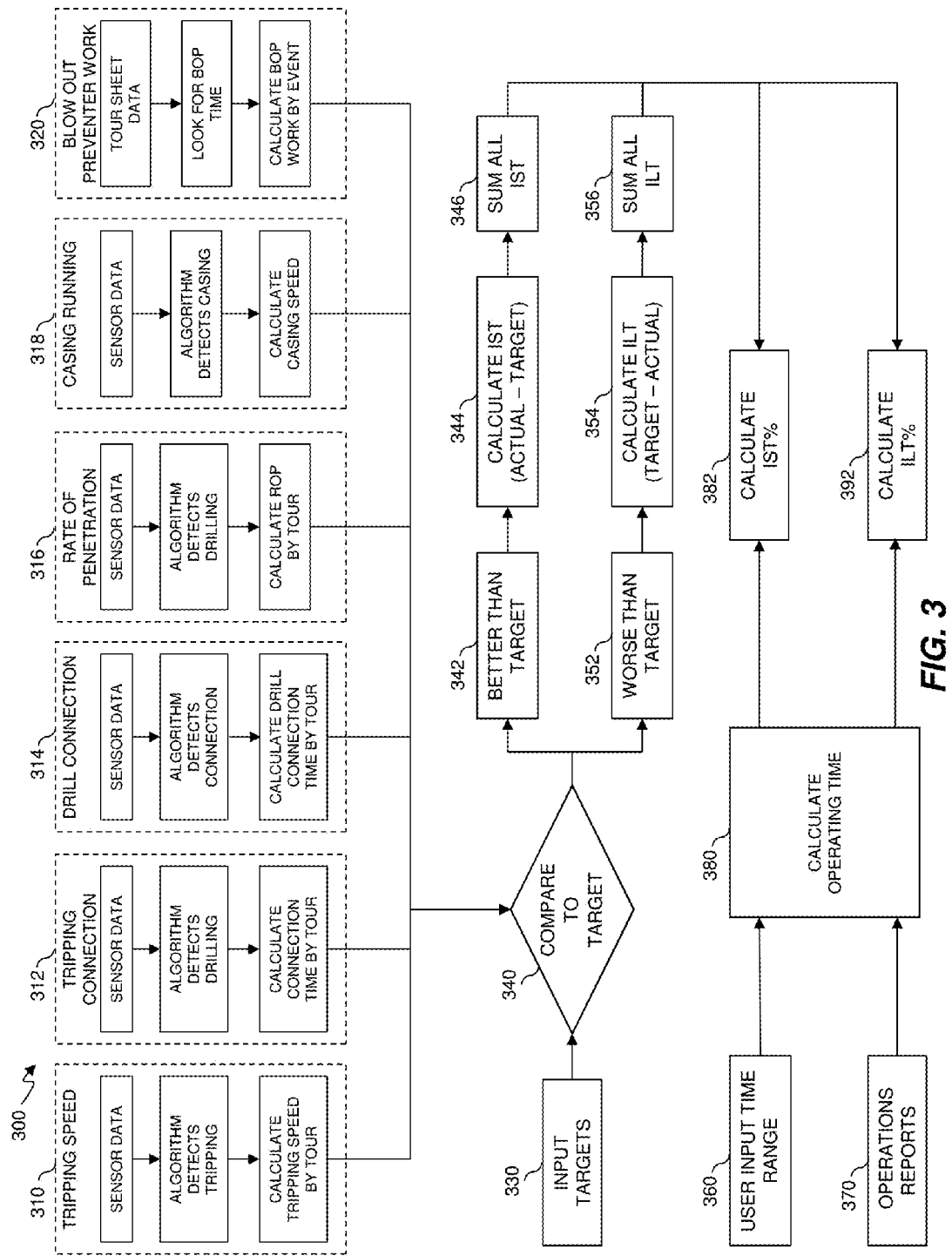
FIG. 3 is a flowchart diagram of a method of calculating an efficiency of a drilling operation according to one or more aspects of the present disclosure.

FIG. 3 is a flow chart showing a method 300 of calculating an ILT period and percentage and an IST period and percentage. The calculation of these values may help a drilling rig operator identify efficiency shortcomings as well as areas that are performing well. In particular, the ILT and IST values are calculated by analyzing sensor data and operations report data and comparing that analysis to inputted data from other sources. The sensor data is collected from various sensors on or around the drilling well as well as operations reports. The sensors may track various well functions. In some implementations, the well functions include one or more KPIs that may be tracked for efficiency measurement purposes. These KPIs may be measured and analyzed in the method of claim 3, and are discussed in reference to FIGS. 4-6. Exemplary KPIs may include tripping speed, tripping connection time, drill connection time, rate of penetration (ROP), casing running speed, and BOP work period. These KPIs may be measured in steps 310, 312, 314, 316, 318, and 320 of method 300. Other KPIs may include downtime, rig maintenance time, BHA handling time, cementing, circulating, Run in Hole (RIH) connection time, total RIH distance, Pull out of Hole (POOH) connection time, POOH tripping speed, total POOH distance, casing connection, and Weight to Weight connection time. The measurement of each KPI may include intermediate steps, which are included within the dashed box of each KPI.

At step 310, the method 300 may include measuring the tripping speed of a drilling rig. Tripping may be defined as moving pipe into or out of the well bore. The tripping speed may be calculated by inputting sensor data from sensors on the drawworks of the drilling rig (such as the position sensor 244 of FIG. 2), as well as sensors on the deadline anchor (such as the load cell 246), mud pumps (such as the mud motor pressure sensor 216), and top drive (such as the surface torque/rpm sensor 232). This sensor data may be collected when the sensor system and controller recognize when tripping begins and ends. The tripping speed may then be calculated for a selected and pre-established time period. In some implementations, the tripping speed is calculated for one 12 hour shift, also known as a tour. In other implementations, tripping speed is measured for an hour, several hours, a day, or other time periods.

At step 312, the method 300 may include measuring the tripping connection time of a drilling rig. Tripping connection time may be defined as the time required to connect or disconnect tubulars during the tripping process. The tripping connection time may be calculated by inputting sensor data from sensors on the drawworks, rig floor, deadline anchor, and top drive of the drilling rig such as the position sensor 244, load cell 246, or surface torque/rpm sensor 232 of FIG. 2. This sensor data may be collected when the sensor system and controller recognize when the tripping connection process begins and ends. The tripping connection time may then be calculated for a selected and pre-established time period. In other implementations, tripping time is measured for an hour, several hours, a day, or other time periods.

At step 314, the method 300 may include measuring the drilling connection time of a drilling rig. Drilling connection time may be defined as the time required to connect or disconnect tubulars and BHA components during the drilling process. The drilling connection time may be calculated by inputting sensor data from sensors on the drawworks, deadline anchor, rig floor, BHA, and top drive of the drilling rig such as the position sensor 244, load cell 246, or surface torque/rpm sensor 232 of FIG. 2. This sensor data may be collected when the sensor system and controller recognize when the drilling connection process begins and ends. The drilling connection time may then be calculated for a selected and pre-established time period. In some implementations, the drilling connection time is calculated for one tour. In other implementations, drilling connection time is measured for an hour, several hours, a day, or other time periods.

At step 316, the method 300 may include measuring the ROP of the drilling rig. ROP may be defined as the speed at which the BHA "makes hole" or drills through the ground. In some implementations, ROP may be further defined as the rotation rate of penetration (which usually refers to vertical drilling operations) or slide rate of penetration (which usually refers to drilling operations at an angle, including horizontal drilling operations). The ROP may be calculated by inputting sensor data from sensors on the drawworks, BHA, mud pump, and top drive of the drilling rig, such as the magnetic toolface sensor 218, the gravity toolface sensor 220, the position sensor 244, the mud motor pressure sensor 216, and the surface torque/rpm sensor 232 of FIG. 2. In some cases, the ROP is also measured by inputting survey results that are generally taken at certain increments of hole depth, such as every 100 feet. This sensor data may be collected when the sensor system and controller recognize movement of the BHA and associated drilling. The ROP may then be calculated for a selected and pre-established time period. In some implementations, the ROP is calculated for one tour. In other implementations, ROP is measured for an hour, several hours, a day, or other time periods.

At step 318, the method 300 may include measuring the casing running speed of a drilling rig. Casing running speed may be defined as the speed at which casing is run into the wellbore. The casing running speed may be calculated by inputting sensor data from sensors on the drive system, drawworks, or deadline anchor such as the position sensor 244, surface torque/rpm sensor 232, and load cell 246 of FIG. 2. This sensor data may be collected when the sensor system and controller recognize when the casing running process begins and ends. The casing running speed may then be calculated for a selected and pre-established time period. In some implementations, the casing running speed is calculated for one tour. In other implementations, casing running speed is measured for an hour, several hours, a day, or other time periods.

At step 320, the method 300 may include measuring time associated with BOP work. BOP work may include the time required to "nipple up" (e.g., install BOP components), "nipple down" (e.g., remove the entire BOP or BOP components), and test the BOP system. BOP work time may be calculated by inputting operations report data, identifying a category on the operations report associated with BOP work, and calculating BOP work by category. The time associated with BOP work may be calculated on a per event basis and may be aggregated by well. The time associated with BOP work may also be aggregated per tour, one hour, several hours, one day, one week, one month, or other time periods.

At step 330, the method 300 may include inputting targets. These targets may include estimated speeds, rates, and time periods associated with each of the KPIs measured in steps 310, 312, 314, 316, 318, and 320. In some implementations, the targets include data from similar wells (such as wells that are in the same area, run by the same client, have the same drilling rig type, or are at the same company level as the present well). In some implementations, the target includes goals for each of the KPIs that are slightly above normal operating standards. In some implementations, the targets are based on the best time possible for each KPI, or a best composite well time. Generating the target will be discussed in more detail in reference to FIGS. 4, 5, 7 and 8.

At step 340 in FIG. 3, the method 300 may include the comparing the values for each of the KPIs to corresponding values from the targets. In some implementations, the measurement of the KPIs in steps 310, 312, 314, 316, 318, and 320 may include multiple drilling periods and multiple values. In this case, each of the drilling periods may be compared to a corresponding target value.

At step 342, KPI values that are better than the target values may be used to calculate the IST period at step 344. In some implementations, the IST period is calculated as the difference between each of the KPI values and the target value. IST periods for each of the KPIs are summed at step 346 to create a total IST for the drilling rig for the time period. The IST period may show the total amount of time saved at the drilling rig for the time period.

At step 352, KPI values that are worse than the target values may be used to calculate the ILT period at step 354. In some implementations, the ILT period is calculated as the difference between the each of the KPI values and the target value. The ILT periods for each of the KPIs are summed at step 356 to create a total ILT time for the drilling rig for the time period. The ILT period may show the total amount of time lost at the drilling rig for the time period.

At step 360, the user may input a time range representing a period of drilling rig operation to be monitored. This time range may be a tour, an hour, several hours, a day, or other time periods. The time range may also be calculated for individual rigs, operators, crews, and other groups. At step 370, operations reports are input into the method. These operations reports may include operations reports from the same time period as the function values are measured. The operations reports may also include historical tour sheets from the present well, as well as past or present tour sheets from other, similar wells. The operations reports may also contain information shown on display 600 of FIG. 6.

At step 380, the method 300 may include calculating the operating time of the drilling rig. In some implementations, the operating time may exclude move times for the drilling rig. At step 382, the method 300 may include calculating an IST percentage based on the calculated operating time of step 380 and the summed IST and ILT times. This calculation may include dividing the total IST time by the operating time for the time period input by the user. At step 392, the method 300 may include calculating an ILT percentage. This calculation may include dividing the total ILT time by the operating time for the time period input by the user.

In some implementations, the total ILT time and ILT percentage may allow the user to see a categorized overview of time lost on the drilling rig. This may help the user to target improvements to the drilling process. Likewise, the total IST time and IST percentage may allow the user to see which areas of the drilling rig are functioning most efficiently.

Figure 4:
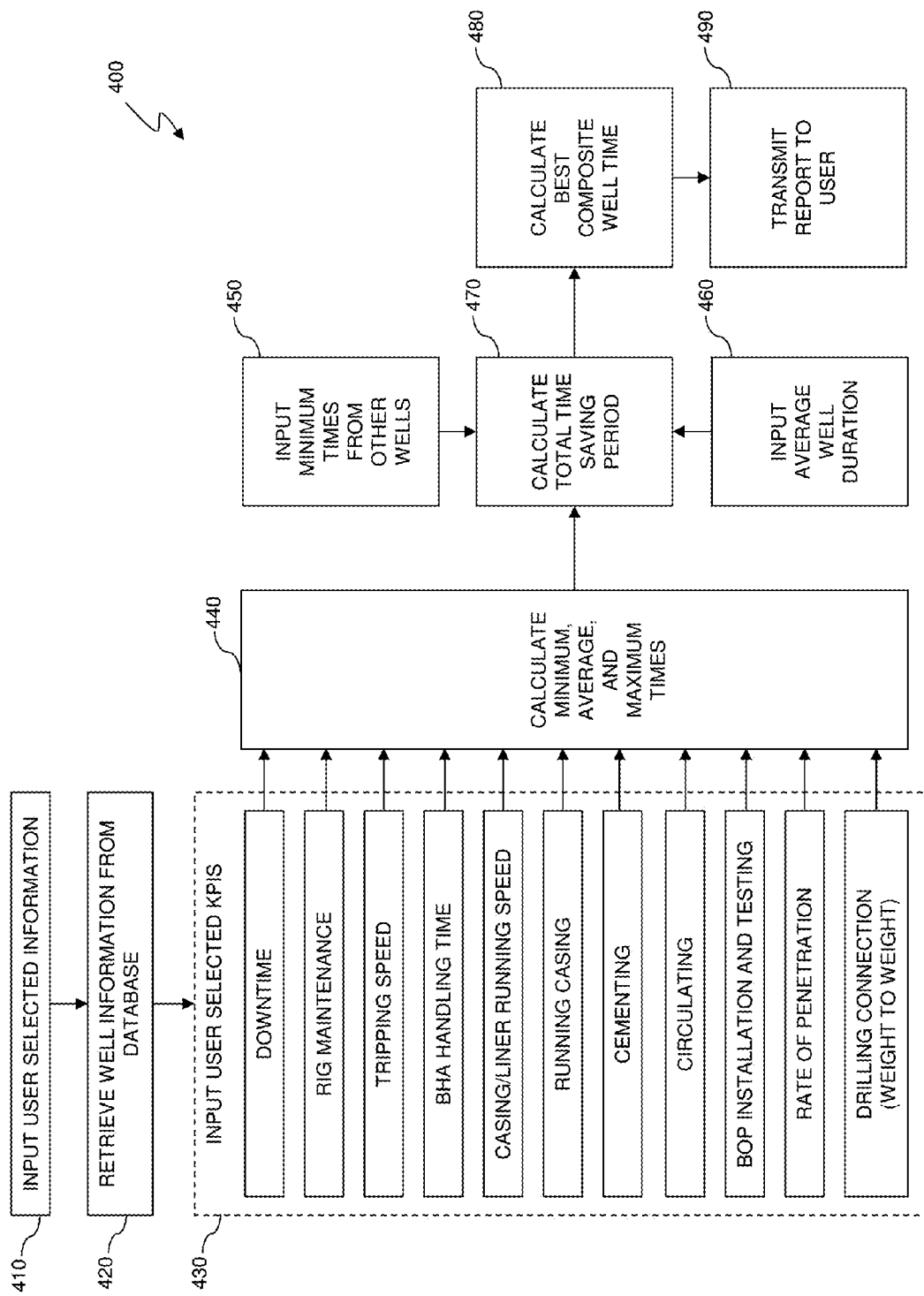
FIG. 4 is a flowchart diagram of a method of generating a report for a user according to or more aspects of the present disclosure.

FIG. 4 is a flow chart showing a method 400 of calculating a best composite well time according to various aspects of the present disclosure. The best composite well time may represent the best time possible for a drilling rig on a well to complete a drilling procedure. In some implementations, the best composite well time is calculated for a specific type of drilling rig. For example, the best composite time for a well may be calculated using values from drilling rigs with similarities including location, area, rig type, and operator. Once calculated, the best composite well time may be used as an input target that may be entered at step 330 of FIG. 3.

At step 410, the method 400 may include inputting user selected information. The user selected information may include selecting the location, area, rig type, client and/or company owning a drilling rig. The user inputted information may help to produce a relevant best composite well time for comparison with the present well. The user selected information may be input into the analysis system such as the controller 252 of FIG. 2 using a user input 262 such as that depicted in FIG. 2.

At step 420, the method 400 may include retrieving well information from a database. In some cases, the well information may include operations reports, tour reports, drilling surveys, and other information that is regularly gathered during a drilling procedure. The well information may also include information received by sensors associated with the drilling rig, such as those discussed in reference to FIG. 2. In some implementations, the well information is continually received by the analysis system. The database may be the database 270 show in reference to FIG. 2.

At step 430, the method 400 may include inputting one or more user selected KPIs including downtime, rig maintenance, tripping speed, BHA handling time, casing/liner running speed, running casing, cementing, circulating, BOP installation and testing, ROP, and drilling connection time. In some implementations, other KPIs associated with drilling rig efficiency may also be input into the analysis system.

In some implementations, the KPIs chosen by the user may be based on existing efficiency systems.

At step 440, the method 400 may include calculating minimum, average, and maximum times associated with each user selected KPI. This step may involve choosing fixed distances, quantities, and time periods associated with the average well profile. For example, the tripping speed may be measured during a 12-hour period at a well with a minimum speed of 900 ft/hr, a maximum speed of 1,500 ft/hr, and an average speed of 1,000 ft/hr. The method may include choosing a fixed distance for comparison purposes such as 10,000 ft. For this example, the maximum tripping speed time for the drilling rig is 11.1 hours, the average time for the drilling rig is 10 hours, and the minimum time for the drilling rig is 6.7 hours. The distances and time periods chosen for the various KPIs may be varied so that the KPI times may be compared against KPIs at other wells.

At step 450, the method 400 may include inputting minimum times from other wells and associated drilling rigs. The other wells and drilling rigs may have some basis for comparison to the present drilling rig, such as a similar location or type. In some implementations, the drilling rigs chosen for the comparison are situated in the same area, owned or operated by the same client, have the same rig type, are drilling in similar environmental conditions, and/or are drilling through similar geology.

At step 460, the method 400 may include inputting an average well duration for each KPI. This step may include further specification of time frames for calculation purposes. For example, the minimum time for tripping speed may be calculated in step 440 to be 6.7 hours, based on the fixed values of a 12-hour shift and a distance of 10,000 ft. The well duration input at step 460 may be set at a week. In this case, the method 400 may include multiplying the minimum time of step 440 by the duration of step 460 for a product of 46.7 hours.

At step 470, the method 400 may include calculating the total time savings of all the KPI times. This may include comparing the minimum KPI times calculated in step 440 to the minimum times of other drilling rigs of step 450. If the minimum time for a certain KPI is lower than the minimum time of other drilling rigs, the difference between these minimum times is recorded as a time saving period. The time saving periods of all the KPIs are then added together to calculate the total time saving period. The time savings periods of all the KPIs may be compared to the average well duration of all wells in the dataset.

At step 480, the method 400 may include calculating a best composite well time. This step may include determining the lowest minimum time for each KPI from either the present drilling rig or the other drilling rigs. These lowest minimum times for each KPI are then added together to create the best composite time for the drilling rig of the present well. In some implementations, the best composite time may be used to represent an ideal drilling well with similar characteristics to the present drilling well. In other words, the best composite time may represent the "best case scenario" for the present well.

At step 490, the method 400 may include transmitting a report to a user containing the total time saving period and the best composite time. The report may also contain the list of user selected KPIs from step 430, the minimum, average, and maximum times for each KPI from step 440, and the minimum times from other wells from step 450. In some implementations, the report is designed to allow the user to quickly assess the efficiency of the drilling operation. In some implementations, the user is a driller and the report is transmitted to a display device such as display 268 of FIG. 2. In some implementations, the report is used as a target for other drilling operations and may be used, for example, in step 330 of FIG. 3.

Figure 5:
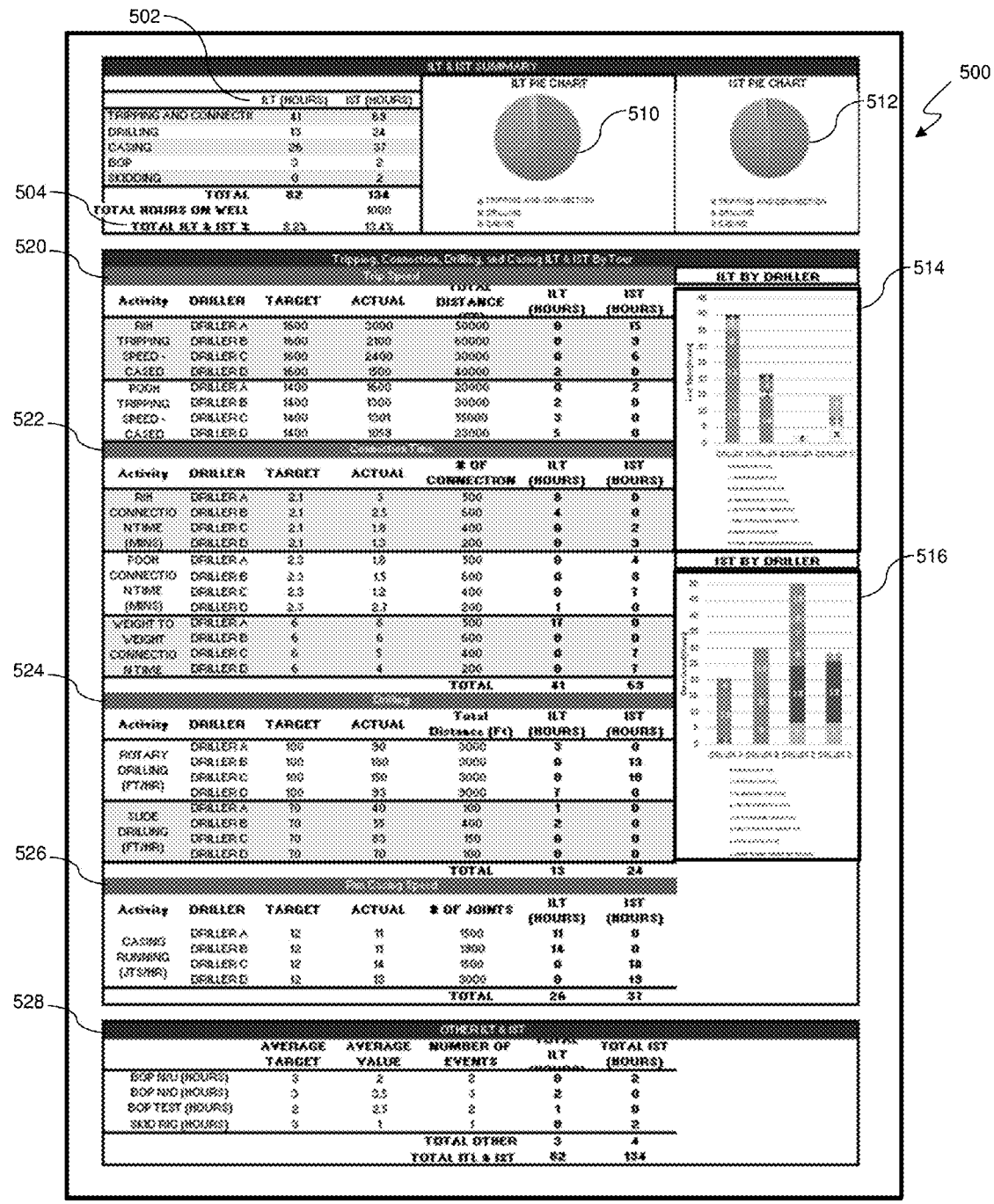
FIG. 5 is a representation of an exemplary display showing ILT and IST measurements according to one or more aspects of the present disclosure.

FIG. 5 is a representation of an exemplary display 500 showing ILT and IST measurements according to one or more aspects of the present disclosure. In some implementations, the display 500 is a human-machine interface (HMI) according to one or more aspects of the present disclosure. The display 500 may also represent a report. The display 500 may be utilized and viewed by a human operator during directional and/or other drilling operations to measure and visualize IST and ILT values for various aspects of a drilling operation. The display 500 may include windows and screens that are selectably viewable by the user during drilling operations, and may be included as or within the human-machine interfaces, drilling operations and/or drilling apparatus described in the systems herein. The display 500 may also be implemented as a series of instructions recorded on a computer-readable medium. In some implementations, the display 500 may be a user display such as the display 268 depicted in FIG. 2.

The display 500 may receive sensor data from one or more sensors associated with a drilling system. In some implementations, the display 500 shows IST and ILT periods associated with the drilling system. The display 500 may include a window 502 showing composite ILT and IST times 504. In some cases, the window 502 represents a section of a report. The composite ILT and IST times 504 may include total ILT and IST times associated with one or more KPIs. KPI windows 520, 522, 524, 526, 528 may each be configured to show rates and time periods associated with each KPI. In particular, the display 500 may include a KPI window 520 for tripping speed, a KPI window 522 for connection time, a KPI window 524 for drilling speed, a KPI window 526 for casing running speed, and a KPI window 528 for other KPIs. In particular, the KPI window 528 may include BOP work measurements, skid rig measurements, and other miscellaneous KPIs. Other KPIs may be represented in the display, either in KPI window 528 or in other KPI windows.

The KPI windows 520, 522, 524, 526, 528 may include recorded measurements for one or more drillers. In the example of FIG. 5, four drillers (Drillers A, B, C, and D) are represented in KPI windows 520, 522, 524, 526. KPI windows 520, 522, 524, 526 may also include a target distance or speed. The targets may include estimates of distance or speed from the present well or other similar wells, such as the input targets discussed in reference to step 330 of FIG. 3. In some implementations, the targets are based on a best composite well time such as that discussed in reference to FIG. 4. The KPI windows 520, 522, 524, 526 may also include actual measurements that reflect the performance of each driller. The comparisons of actual measurements with the targets for each KPI may be used to produce an ILT period and IST period for each driller. These periods are then added together to produce a total ILT period and a total IST period for each KPI.

The display 500 may also include other visual representations of ILT periods and IST periods. For example, pie charts 510 and 512 may show the relative proportions of ILT periods and IST periods associated with various KPIs. These pie charts 510, 512 may be used by a driller to help visualize where the largest amount of time is being saved or lost during the drilling operation. The display 500 may also include other visual representations, such as bar graphs in windows 514 and 516. In particular, window 514 may include a bar graph showing ILT periods for each driller, and window 516 may include a bar graph showing IST periods for each driller. Other visual representation may be included in the display 500 including charts, graphs, spreadsheets, histograms, time reports, and other display elements.

Figure 6:
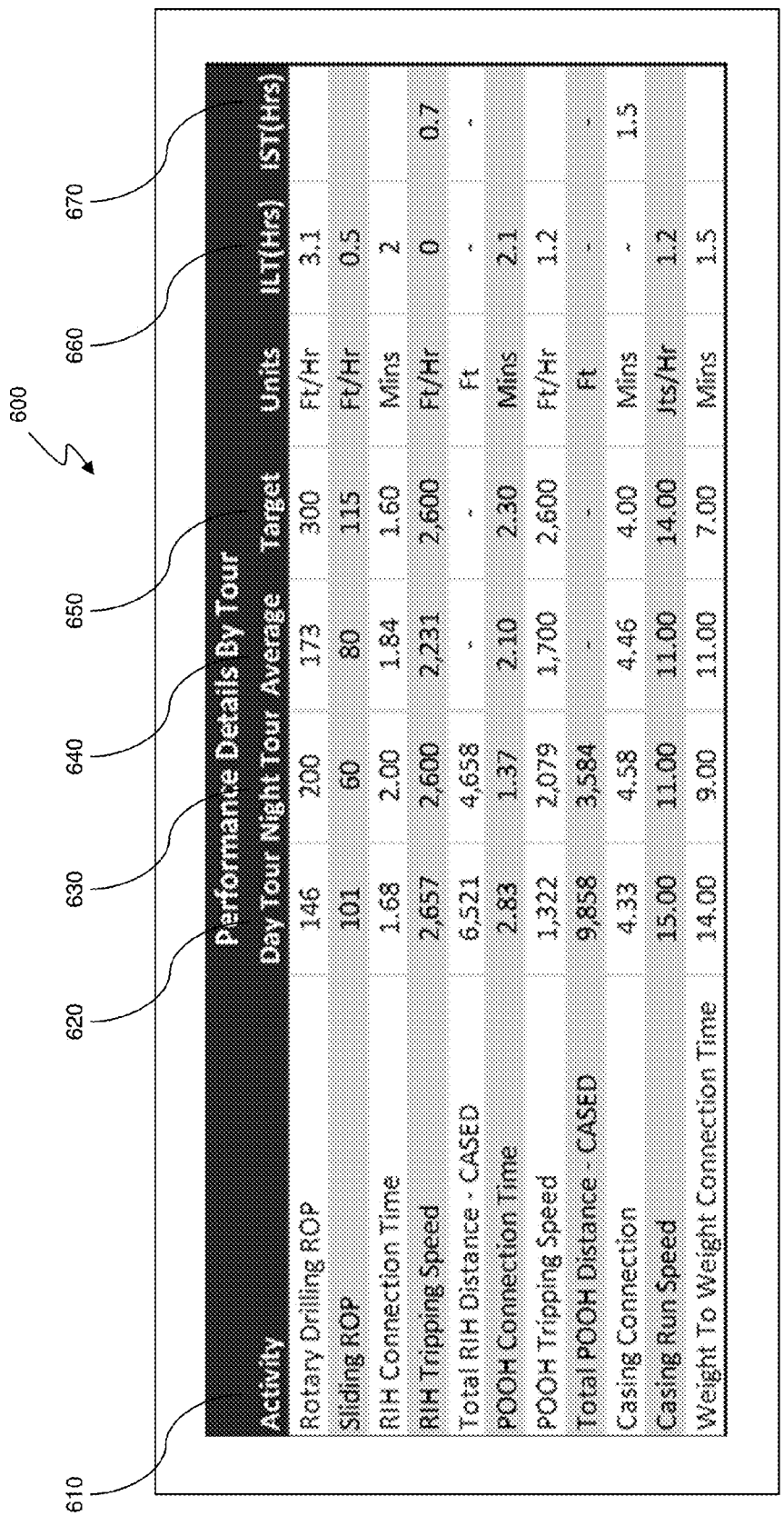
FIG. 6 is a representation of an exemplary display showing a report according to one or more aspects of the present disclosure.

FIG. 6 is a representation of an exemplary display 600 showing operation performance details. The operation performance details may include KPIs 610 as discussed in reference to FIGS. 4 and 5. In some implementations, the operation performance details may help a driller to track the performance of a drilling rig in reference to various KPIs 610 during one or more tours. The KPIs 610 may be chosen by a user and may include rotary drilling ROP, sliding ROP, RIH connection time, RIH tripping speed, total RIH distance, POOH connection time, POOH tripping speed, total POOH distance, casing connection, casing running speed, Weight to Weight connection time, and other measurements.

The operation performance details of display 600 may include measurements for each KPI 610 for a day tour 620 and a night tour 630. An average 640 value may be included on the display 600 that is calculated by averaging the measurements of the day tour 620 and the night tour 630 together. A target 650 may also be included. In some implementations, the target 650 includes the best composite well time as discussed in reference to FIG. 4. The display 600 may also include a measured ILT period 660 and a measured IST period 670 corresponding to each KPI 610. The ILT period and the IST period may be calculated by comparing the measurements for each KPI 610 with the measurements for the target 650.

FIGS. 7A-7D show exemplary efficiency tracking charts. The controller 252 of FIG. 2 or other controllers may calculate the data shown on the charts and present it to a user. Charts with similar data to FIGS. 7A-7D may be included in display 500 of FIG. 5 and display 600 of FIG. 6. In particular, the charts of 7A-7D may depict measurements of various KPIs tracked for several operators or rigs. The data displayed on these graphs may be used to generate a best composite well time, as well as allowing a side by side comparison of drillers.

Figure 7A:
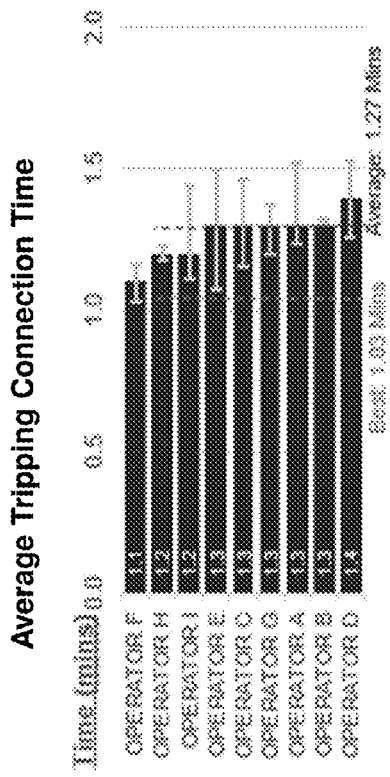
FIG. 7A is a representation of an exemplary efficiency tracking chart according to one or more aspects of the present disclosure.

FIG. 7A shows measurements of an average cased hole tripping speed by operators A-F. The performance of the operators has been recorded for several drilling operations and the ranges of the performances are shown by bars at the ends of each bar.

Figure 7B:
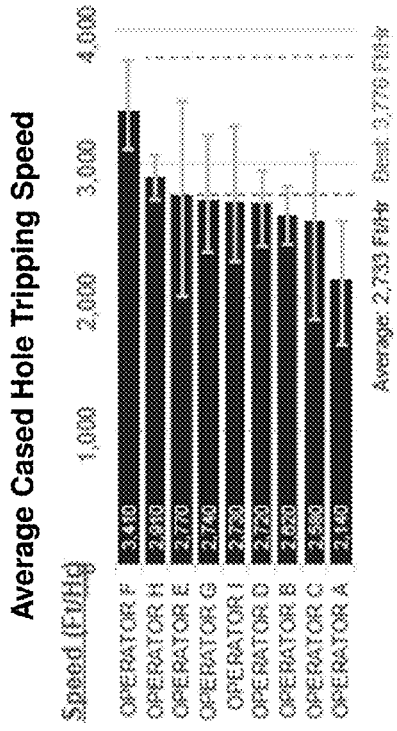
FIG. 7B is a representation of another exemplary efficiency tracking chart according to one or more aspects of the present disclosure.

FIG. 7B shows average tripping connection time measurements for operators A-F. The performance of the operators has been recorded for several drilling operations.

Figure 7C:
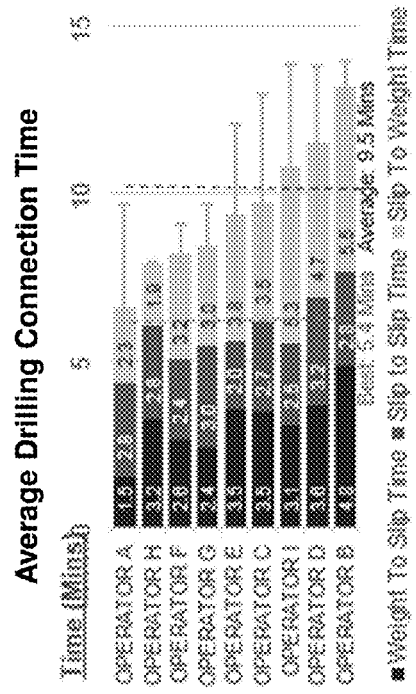
FIG. 7C is a representation of another exemplary efficiency tracking chart according to one or more aspects of the present disclosure.

FIG. 7C shows average ROP time measurements for operators A-F. The performance of the operators has been recorded for several drilling operations.

Figure 7D:
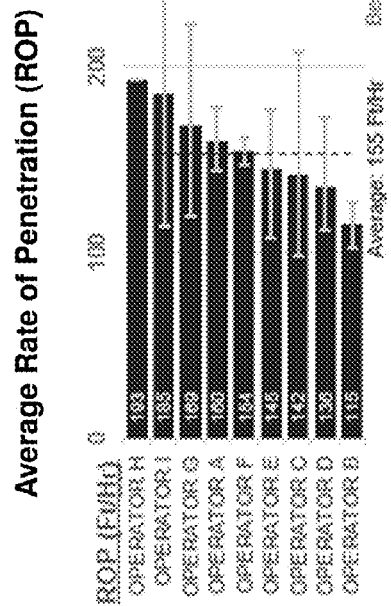
FIG. 7D is a representation of another exemplary efficiency tracking chart according to one or more aspects of the present disclosure.

FIG. 7D shows average drilling connection time measurements for operators A-F. In some implementations, the measurements are subdivided into separate sections for Weight to Slip time, Slip to Slip time, and Slip to Weight time.

Figure 8:
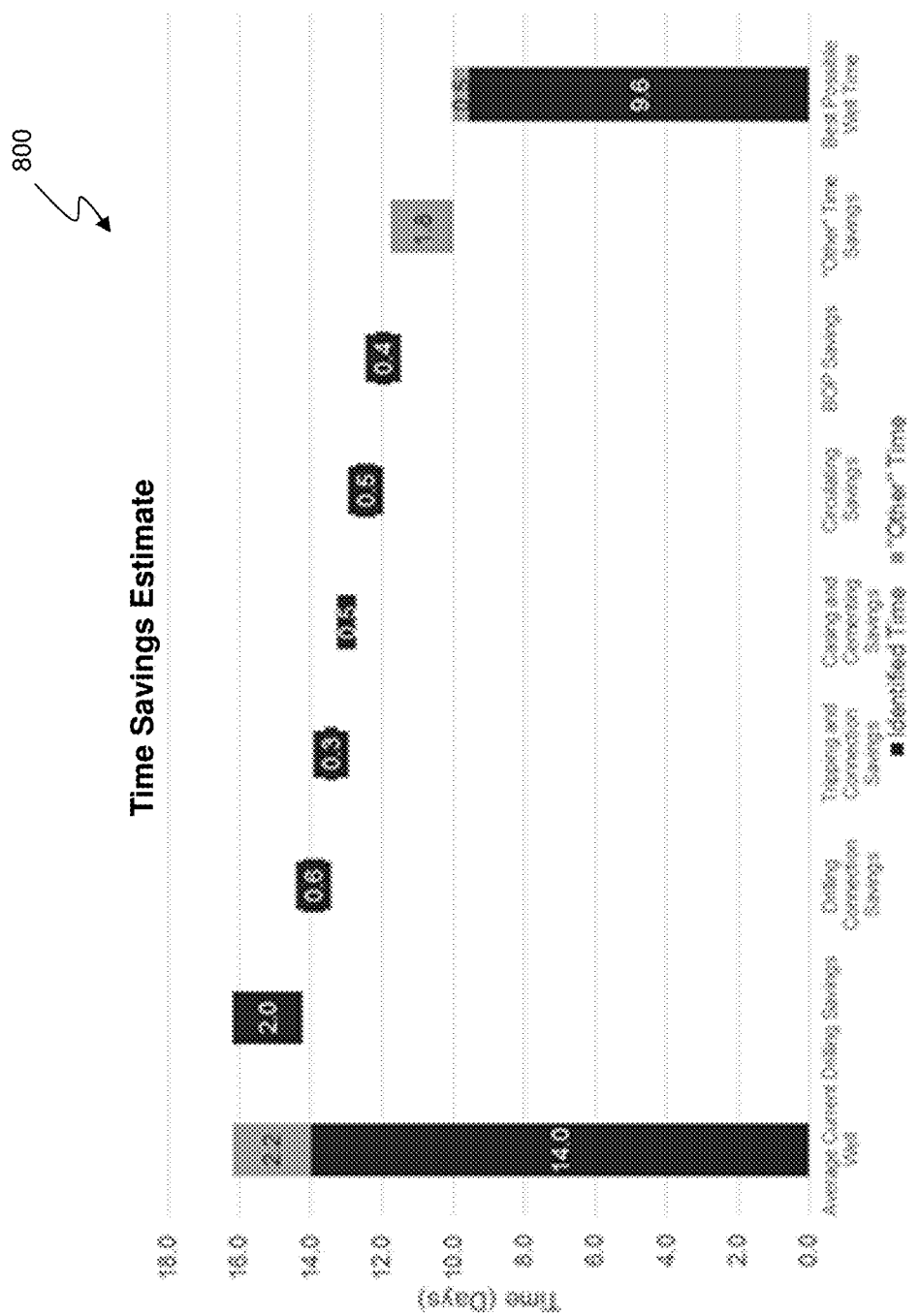
FIG. 8 is a representation of an exemplary savings estimate chart according to one or more aspects of the present disclosure.

FIG. 8 shows a representation of an exemplary time savings estimate chart 800 according to one or more aspects of the present disclosure. The chart 800 may show time savings estimates during a drilling operation that are broken down into various categories or KPIs. In some implementations, the time savings estimates include IST values that are calculated in by method 300 in FIG. 3. The KPIs represented on the graph may be chosen by a user and may include drilling connection time, tripping and connection times, casing and cementing times, circulation time, BOP work time, and other KPIs. The chart 800 may also shows include a best possible well time that may be calculated in way similar to the best composite well time described in method 400 of FIG. 4. The chart 800 may be depicted on the display 500 of FIG. 5. In some implementations, the chart 800 may be used by a driller to visualize the relative time savings of different activities on a drilling rig.

In view of all of the above and the figures, one of ordinary skill in the art will readily recognize that the present disclosure introduces a drilling apparatus that may include: a first sensor system connected to the drilling apparatus and configured to detect at least one measurable parameter of the drilling apparatus; a data input system operable to receive an efficiency target; a controller in communication with the first sensor system and the data input system, the controller being operable to generate an efficiency report for a drilling operation, the efficiency report including at least one Key Performance Indicator (KPI) based on the at least one measurable parameter, the controller further operable to calculate an Invisible Lost Time (ILT) period based on a difference between the at least one KPI and the efficiency target; and an output device in communication with the controller, the output device configured to output to a user the efficiency report and the ILT period.

In some implementations, the controller is further operable to calculate an Invisible Saved Time (IST) period based on the difference between the at least one KPI and the efficiency target. The at least one KPI may include at least one of a tripping speed, a tripping connection time, a drill connection time, a rate of penetration (ROP), a casing running speed, a casing connection time, a blow out preventer (BOP) work time period, a rig maintenance time, a Bottom Hole Assembly (BHA) handling time, a cementing time, and a circulating time. In some implementations, at least one KPI is based on measured data from an operations report.

The controller may be further operable to generate a plurality of time periods required to complete tasks on the drilling apparatus based on each of the at least one KPI. The efficiency target may be based on a best composite well time for the drilling apparatus, wherein the best composite well time is calculated by adding together a lowest time period of the plurality of time periods based on each of the at least one KPI. The output device may include at least one of a display, an email report, or a printed report.

In some implementations, the efficiency target includes at least one KPI from the second drilling apparatus based on the measurable parameters from the second drilling apparatus. The second drilling apparatus may have at least one feature in common with the drilling apparatus including at least one of a common drilling area, a common drilling client, a common rig type, a common well type, a common geology, a common location, and a common operator.

In some implementations, a drilling rig efficiency tracking system is provided which may include: a data input system operable to receive sensor data for a first drilling rig, an operations report, and a efficiency target; a controller in communication with the data input system, the controller operable to compare the sensor data and the operations report to the efficiency target to generate an efficiency report for the first drilling rig, the efficiency report including an Invisible Lost Time (ILT) period based on a comparison of the sensor data to the efficiency target; and an output device in communication with the controller, the output device configured to output the efficiency report to a user.

In some implementations, the efficiency report further includes an Invisible Saved Time (IST) period based on the comparison of the sensor data to the efficiency report. The efficiency target may include an operations report from a second drilling rig. In some implementations, the second drilling rig has at least one feature in common with the first drilling rig including at least one of a common drilling area, a common drilling client, a common rig type, a common well type, a common geology, a common location, and a common operator.

In some implementations, a method for tracking efficiency of a drilling rig is provided, which may include: receiving, with a controller, at least one measurable parameter for a drilling operation from a sensor system associated with the drilling rig; generating at least one Key Performance Indicator (KPI) based on the drilling operation; calculating, with the controller, at least one performance time period for each of the at least one KPI based on the at least one measurable parameter, receiving, with the controller, at least one target time period; calculating, with the controller, an Invisible Lost Time (ILT) period based on a difference between the at least one performance time period and the at least one target time period; and outputting the ILT period to a user on an output device.

In some implementations, the at least one target time period is based on a best composite well time for the drilling rig, wherein the best composite well time is calculated by adding together a lowest time period associated with the at least one KPI. The at least one KPI may include at least one of a tripping speed, a tripping connection time, a drill connection time, a rate of penetration (ROP), a casing running speed, a casing connection time, a blow out preventer (BOP) work time period, a rig maintenance time, a Bottom Hole Assembly (BHA) handling time, a cementing time, and a circulating time.

In some implementations, the method further includes defining a first operating time period for the drilling rig. The method may further include calculating an ILT percentage by dividing the ILT period by the first operating time period. In some implementations, the method may also include calculating, with the controller, an Invisible Saved Time (IST) period based on the difference between the at least one performance time period and the at least one target time period; and outputting the IST period to a user on an output device or a report generated for the user. The method may also include calculating an IST percentage by dividing the IST period by a first operating time period.

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. §112(f) for any limitations of any of the claims herein, except for those in which the claim expressly uses the word "means" together with an associated function.

What is claimed is:

1. A drilling apparatus comprising:
 a first sensor system connected to the drilling apparatus and configured to detect at least one measurable parameter of the drilling apparatus;
 a data input system operable to receive an efficiency target;
 a controller in communication with the first sensor system and the data input system, the controller being operable to generate an efficiency report for a drilling operation, the efficiency report including at least one Key Performance Indicator (KPI) based on a measured time period taken to complete at least one measurable parameter of the drilling apparatus during the drilling operation, the controller further operable to calculate an Invisible Lost Time (ILT) period based on a difference between the at least one KPI and the efficiency target;
 a drilling apparatus control device in communication with the controller and configured to control a drilling apparatus function comprising moving at least a portion of the drilling apparatus, the drilling apparatus function forming at least a part of the drilling operation based on the efficiency report; and
 an output device in communication with the controller, the output device configured to output to a user the efficiency report and the ILT period.

2. The drilling apparatus of claim 1, wherein the controller is further operable to calculate an Invisible Saved Time (IST) period based on the difference between the at least one KPI and the efficiency target.

3. The drilling apparatus of claim 1, wherein the at least one KPI includes at least one of a tripping speed, a tripping connection time, a drill connection time, a rate of penetration (ROP), a casing running speed, a casing connection time, a blow out preventer (BOP) work time period, a rig maintenance time, a Bottom Hole Assembly (BHA) handling time, a cementing time, and a circulating time.

4. The drilling apparatus of claim 1, wherein the at least one KPI is based on measured data from an operations report.

5. The drilling apparatus of claim 1, wherein the controller is further operable to generate a plurality of time periods required to complete tasks on the drilling apparatus based on each of the at least one KPI.

6. The drilling apparatus of claim 5, wherein the efficiency target is based on a best composite well time for the drilling apparatus, wherein the best composite well time is calculated by adding together a lowest time period of the plurality of time periods based on each of the at least one KPI.

7. The drilling apparatus of claim 1, wherein the output device includes at least one of a display, an email report, or a printed report.

8. The drilling apparatus of claim 7, wherein the efficiency target includes at least one KPI from a second drilling apparatus based on the measurable parameters from the second drilling apparatus.

9. The drilling apparatus of claim 8, wherein the second drilling apparatus has at least one feature in common with the drilling apparatus including at least one of a common drilling area, a common drilling client, a common rig type, a common well type, a common geology, a common location, and a common operator.

10. A drilling rig efficiency tracking system comprising:
a data input system operable to receive sensor data for a first drilling rig, an operations report for a drilling operation, and an efficiency target;
a controller in communication with the data input system, the controller operable to compare the sensor data and the operations report to the efficiency target to generate an efficiency report for the first drilling rig, the sensor data including a measured time period taken to complete a task during the drilling operation, the efficiency report including an Invisible Lost Time (ILT) period based on a difference between the measured time period of the sensor data and the efficiency target;
a drilling rig control device in communication with the controller and configured to control a drilling rig function comprising moving at least a portion of the drilling rig, the drilling rig function forming at least a part of the drilling operation based on the efficiency report; and
an output device in communication with the controller, the output device configured to output the efficiency report to a user.

11. The system of claim 10, wherein the efficiency report further includes an Invisible Saved Time (IST) period based on the comparison a difference between the measured time period of the sensor data and the efficiency report.

12. The system of claim 10, wherein the efficiency target includes an operations report from a second drilling rig.

13. The system of claim 12, wherein the second drilling rig has at least one feature in common with the first drilling rig including at least one of a common drilling area, a common drilling client, a common rig type, a common well type, a common geology, a common location, and a common operator.

14. A method for tracking efficiency of a drilling rig, comprising:
receiving, with a controller, at least one measurable parameter for a drilling rig function comprising moving at least a portion of the drilling rig, the drilling rig function forming at least a part of a drilling operation from a sensor system associated with the drilling rig;
generating at least one Key Performance Indicator (KPI) based on the drilling operation;
calculating, with the controller, at least one performance time period for each of the at least one KPI based on the at least one measurable parameter, the performance time period based on a measured time taken to complete a task on the drilling rig during the drilling operation;
receiving, with the controller, at least one target time period;
calculating, with the controller, an Invisible Lost Time (ILT) period based on a difference between the at least one performance time period and the at least one target time period;
receiving, with a drilling rig control device configured to control the drilling rig function, the ILT period;
controlling, with the drilling rig control device, the drilling rig function based on the ILT period; and
outputting the ILT period to a user on an output device.

15. The method of claim 14, wherein the at least one target time period is based on a best composite well time for the drilling rig, wherein the best composite well time is calculated by adding together a lowest time period associated with the at least one KPI.

16. The method of claim 14, wherein the at least one KPI includes at least one of a tripping speed, a tripping connection time, a drill connection time, a rate of penetration (ROP), a casing running speed, a casing connection time, a blow out preventer (BOP) work time period, a rig maintenance time, a Bottom Hole Assembly (BHA) handling time, a cementing time, and a circulating time.

17. The method of claim 14, further comprising defining a first operating time period for the drilling rig.

18. The method of claim 17, further comprising calculating an ILT percentage by dividing the ILT period by the first operating time period.

19. The method of claim 14, further comprising calculating, with the controller, an Invisible Saved Time (IST) period based on the difference between the at least one performance time period and the at least one target time period; and
outputting the IST period to a user on an output device or a report generated for the user.

20. The method of claim 19, further comprising calculating an IST percentage by dividing the IST period by a first operating time period.

21. A drilling rig comprising:
a sensor system located on the drilling rig and arranged to measure one or more parameters of the drilling rig, the one or more parameters including a weight on bit, a bit depth, a hole depth, a hookload, a block height, a flow rate, a pump pressure, a top drive torque, and a top drive RPM;
a controller in communication with the sensor system, the controller operable to receive measurements of the one or more parameters from the sensor system, the controller operable to generate an efficiency report for the drilling rig which includes a comparison of a measured time period to complete a task during a drilling operation on the drilling rig based on the one or more parameters with an efficiency target for the one or more parameters, the controller further operable to calculate an Invisible Lost Time (ILT) period based on a difference between the measured time period and the efficiency target; and
an output device in communication with the controller, the output device configured to output to a user the efficiency report and the ILT period, the output device further configured to control a drilling rig function comprising moving at least a portion of the drilling rig based on the efficiency report.

22. The drilling rig of claim 21, wherein the controller is further operable to calculate an Invisible Saved Time (IST) period based on the difference between the one or more parameters and the efficiency target.

23. The drilling rig of claim 21, wherein the efficiency target includes data from at least one measured parameter from a second drilling rig.

* * * * *